United States Patent
Colino Vega

(10) Patent No.: US 10,815,683 B2
(45) Date of Patent: Oct. 27, 2020

(54) VERTICAL FORMWORK WITH TIE ROD AND TIE ROD ANCHOR

(71) Applicant: ULMA C y E, S. Coop., Oñati (ES)

(72) Inventor: Manuel Colino Vega, Vitoria-Gasteiz (ES)

(73) Assignee: ULMA C Y E, S. COOP., Oñati (ES)

( * ) Notice: Subject to any disclaimer, the term of this patent is extended or adjusted under 35 U.S.C. 154(b) by 17 days.

(21) Appl. No.: 16/217,549

(22) Filed: Dec. 12, 2018

(65) Prior Publication Data

US 2019/0112826 A1    Apr. 18, 2019

Related U.S. Application Data

(63) Continuation of application No. PCT/EP2017/064791, filed on Jun. 16, 2017.

(30) Foreign Application Priority Data

Jun. 17, 2016   (EP) .................................... 16382280

(51) Int. Cl.
   *E04G 17/065*  (2006.01)
(52) U.S. Cl.
   CPC ..... *E04G 17/0657* (2013.01); *E04G 17/0652* (2013.01)
(58) Field of Classification Search
   CPC .............. E04G 17/0652; E04G 17/065; E04G 17/0651; E04G 17/0654; E04G 17/0655; E04G 17/0657; E04G 17/0658; F16B 43/001
   USPC ............................................. 249/40, 42, 43
   See application file for complete search history.

(56) References Cited

U.S. PATENT DOCUMENTS

| 915,995 | A | * | 3/1909 | McCarty | ................. E04G 11/28 249/10 |
| 1,808,912 | A | * | 6/1931 | Willard | ............... E04G 17/0742 249/42 |
| 1,935,218 | A | * | 11/1933 | Umbach | ............. E04G 17/0658 249/190 |
| 2,014,080 | A | * | 9/1935 | Colt | ...................... E04G 17/065 249/217 |

(Continued)

FOREIGN PATENT DOCUMENTS

| AT | 519100 B1 | * | 4/2018 | ......... E04G 17/0652 |
| CA | 2854173 A1 | * | 12/2014 | ............. E04G 17/00 |

(Continued)

OTHER PUBLICATIONS

International Search Report and Written Opinion in corresponding International Application No. PCT/EP2017/064791, dated Jul. 17, 2017, 14 pages.

(Continued)

*Primary Examiner* — Michael Safavi
(74) *Attorney, Agent, or Firm* — Edell, Shapiro & Finnan, LLC

(57) ABSTRACT

An anchor for a vertical formwork having two formwork panels facing one another. The anchor is suitable for being fixed to one of the formwork panels. The anchor includes a housing for receiving a part of a tie rod fixing the two formwork panels and sealing means configured for sealing the anchor with respect to the formwork panel in which it is fixed and with respect to the tie rod housed in the housing of the anchor.

17 Claims, 18 Drawing Sheets

(56) References Cited

U.S. PATENT DOCUMENTS

| | | | | |
|---|---|---|---|---|
| 2,270,035 A * | 1/1942 | Colt | ................... | E04G 17/0658 249/42 |
| 3,328,055 A * | 6/1967 | Lang | ...................... | F16L 15/08 403/168 |
| 3,490,730 A * | 1/1970 | Gates, Jr. | ............ | E04G 17/0754 249/43 |
| 3,618,887 A * | 11/1971 | Eriksson | ............. | E04G 17/0721 249/10 |
| 3,633,867 A * | 1/1972 | Eriksson | ............. | E04G 17/0642 249/213 |
| 3,676,031 A * | 7/1972 | Stinton et al. | ............ | E04C 5/12 425/111 |
| 3,690,613 A * | 9/1972 | Shoemaker | ......... | E04G 17/0721 249/40 |
| 3,801,061 A * | 4/1974 | Holt | ................... | E04G 17/0721 249/190 |
| 3,905,093 A * | 9/1975 | Williams | ............. | E04G 17/0742 29/525.02 |
| 3,918,673 A * | 11/1975 | Abbott | ................ | E04G 17/0721 249/43 |
| 3,927,857 A * | 12/1975 | Lovisa | ................ | E04G 17/0735 249/217 |
| 4,159,099 A * | 6/1979 | Maguire | ............... | E04G 15/061 249/177 |
| 5,497,592 A * | 3/1996 | Boeshart | ............... | E04B 2/8647 249/43 |
| 5,761,874 A * | 6/1998 | Hayakawa | .............. | E04G 17/06 249/40 |
| 7,124,547 B2 * | 10/2006 | Bravinski | ............... | E02D 27/02 52/426 |
| 8,220,772 B2 * | 7/2012 | Schwoerer | ......... | E04G 17/0657 249/216 |
| 9,222,271 B2 | 12/2015 | Amon | | |
| 9,580,922 B2 * | 2/2017 | Hagemes | ............ | E04G 17/0652 |
| 2004/0079860 A1 * | 4/2004 | Ward | ................... | E04G 17/045 249/33 |
| 2008/0173788 A1 * | 7/2008 | Brewka | ................... | E04G 11/10 249/189 |
| 2012/0304570 A1 * | 12/2012 | Braun | ..................... | E04G 17/06 52/426 |
| 2014/0374568 A1 * | 12/2014 | Amon | ....................... | E04G 7/32 249/1 |
| 2015/0167329 A1 * | 6/2015 | Hagemes | ............ | E04G 17/0652 52/745.21 |
| 2017/0002575 A1 * | 1/2017 | Dingler | ................... | E04G 17/14 |

FOREIGN PATENT DOCUMENTS

| | | | | |
|---|---|---|---|---|
| DE | 1684261 A1 * | 3/1971 | ......... | E04G 17/0652 |
| DE | 2422224 A1 * | 11/1975 | .......... | E04G 17/065 |
| EP | 1967669 A1 * | 9/2008 | .............. | E04G 9/10 |
| EP | 2126248 B1 | 7/2011 | | |
| EP | 2816175 A1 | 12/2014 | | |
| EP | 3181781 A1 * | 6/2017 | ............. | F16B 5/065 |
| FR | 1547267 A * | 11/1968 | .......... | E04G 17/065 |
| IT | VI20100233 A1 * | 2/2012 | ........ | E04G 17/0652 |
| JP | 3161312 U * | 7/2010 | ......... | E04G 17/0658 |
| KR | 20080001412 U | 5/2008 | | |
| KR | 20100006679 U | 7/2010 | | |
| KR | 1014976880000 B1 | 3/2015 | | |
| WO | WO9514837 A1 * | 6/1995 | ............ | E04G 17/00 |
| WO | WO-0155531 A1 * | 8/2001 | .......... | E04B 1/4121 |
| WO | 2008089442 A2 | 7/2008 | | |
| WO | WO-2012020519 A1 * | 2/2012 | ........ | E04G 17/0658 |
| WO | WO2018137728 A1 * | 8/2018 | ........ | E04G 17/0652 |

OTHER PUBLICATIONS

Extended European Search Report in corresponding European Application No. 16382280.2, dated Sep. 30, 2016.

* cited by examiner

VERTICAL FORMWORK WITH TIE ROD AND TIE ROD ANCHOR

CROSS-REFERENCE TO RELATED APPLICATIONS

This application relates to and claims the benefit and priority to International Application No. PCT/EP2017/064791, filed Jun. 16, 2017, which relates to and claims the benefit and priority to European Application No. EP16382280.0, filed Jun. 17, 2016.

TECHNICAL FIELD

The present invention relates to an anchor for a vertical formwork and to a vertical formwork.

BACKGROUND

The use of vertical formworks for making vertical structures, such as walls, is known. Vertical formworks comprise formwork panels arranged facing one another and fixed to one another by means of tie rods or anchor rods. The vertical formworks comprise anchors for fixing the tie rods to the formwork panels.

An important aspect of vertical formworks is the sealing of the formwork panel with respect to the anchor and the tie rod, since if the sealing is not done suitably, when the concrete is poured between the formwork panels, concrete leakage could take place. To prevent concrete leakage, vertical formworks comprise sealing means.

EP2126248A1 discloses a vertical formwork in which sealing means IS arranged in the formwork panel.

In addition, EP2816175A1 discloses a vertical formwork in which the sealing means IS arranged in the anchor. The anchor is housed in a housing of the formwork panel. The part of the anchor which is supported against the formwork panel has a spherical shape and the part of the housing on which the spherical part of the anchor is supported has a complementary shape, such that sealing is achieved by means of the support between both surfaces. The sealing means IS arranged inside the anchor, sealing the attachment between the tie rod and the anchor itself.

Finally, WO2008089442A2 discloses a vertical formwork in which the sealing means is arranged in the anchor. The sealing means comprises a first sealing element which is arranged in the outer part of the anchor and the purpose of which is to seal the anchor with respect to the formwork panel. The sealing means also comprises a plurality of sealing elements inside the anchor for sealing the attachment between the tie rod and the anchor itself.

SUMMARY OF THE DISCLOSURE

A first aspect of the disclosure relates to an anchor for a vertical formwork, the vertical formwork comprising two formwork panels facing one another and the anchor being suitable for being fixed to one of the formwork panels.

The anchor comprises a housing suitable for receiving a part of a tie rod fixing the two formwork panels facing one another, and sealing means configured for sealing the anchor with respect to the formwork panel in which it is fixed and with respect to the tie rod housed in the housing of the anchor.

The sealing means comprises a sealing element which is arranged at the end of the anchor and configured for sealing both the anchor with respect to the formwork panel in which it is fixed and the anchor with respect to the tie rod housed in the housing of the anchor.

The sealing element comprises a sealing ring, the sealing ring comprising an outer wall configured to be supported against the formwork panel. The sealing element further comprises an end ring configured to be supported against the tie rod housed in the anchor, such that the anchor is sealed with respect to the tie rod.

A second aspect of the disclosure relates to a vertical formwork comprising at least two formwork panels arranged facing one another. The vertical formwork also comprises an anchor fixed to each of the formwork panels, the anchor having the features described above, and a tie rod fixed to the anchor fixed in each of the formwork panels.

The sealing elements are elements that tend to deteriorate with use due to the stress they withstand. The fact that the sealing means is arranged in the anchor and not in the formwork panel makes it easier to replace damaged sealing elements, since the anchors are parts which are more manageable than the formwork panels in regard to size and weight.

Arranging the sealing element at one end of the anchor instead of inside the same makes the sealing element more accessible, making it easier to replace it.

As a result, replacing a damaged sealing element is done in a quick and simple manner.

Furthermore, the two required seals are established with a single sealing element, i.e., on one hand the seal between the anchor and the respective formwork panel, and on the other the seal between the anchor and the tie rod housed in the housing of the anchor itself.

These and other advantages and features will become evident in view of the drawings and the detailed description.

DETAILED DESCRIPTION

Figure 1:
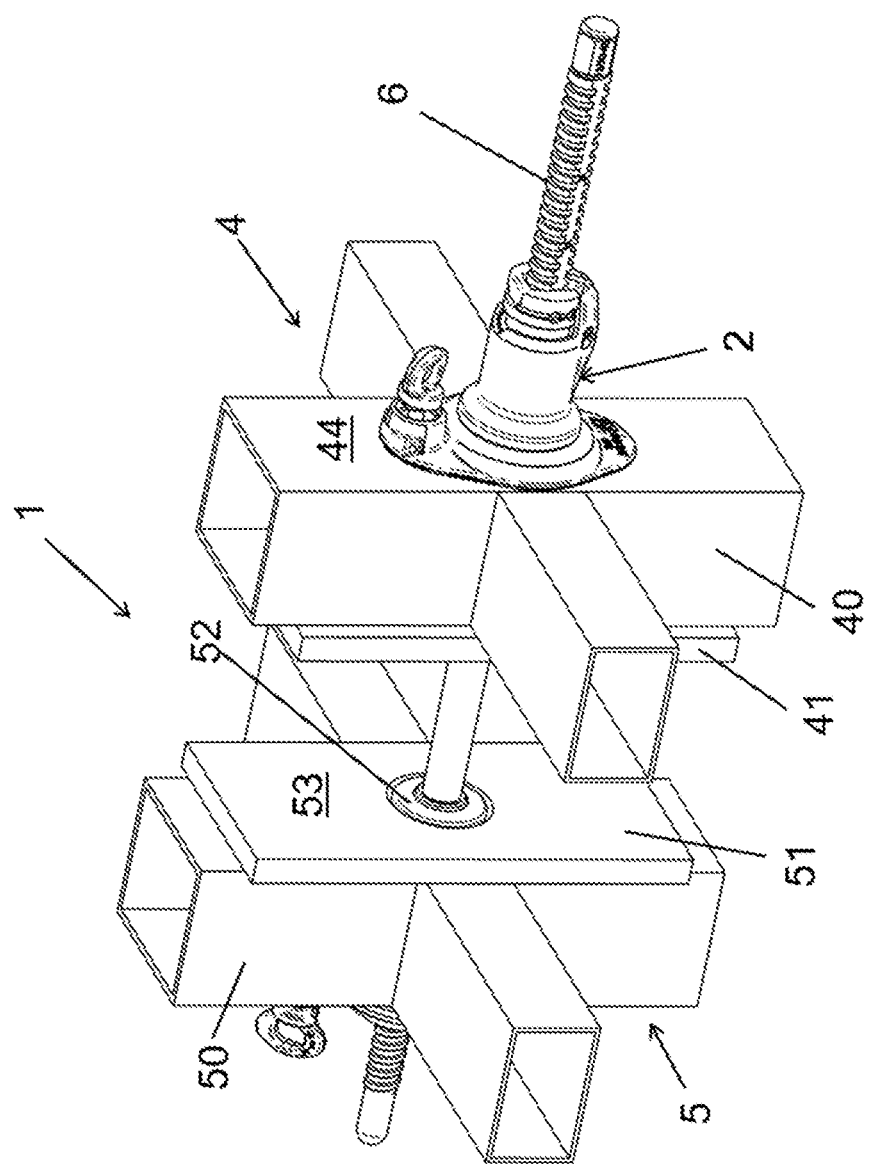
FIG. 1 shows a perspective view of a vertical formwork according to one embodiment.
Figure 2:
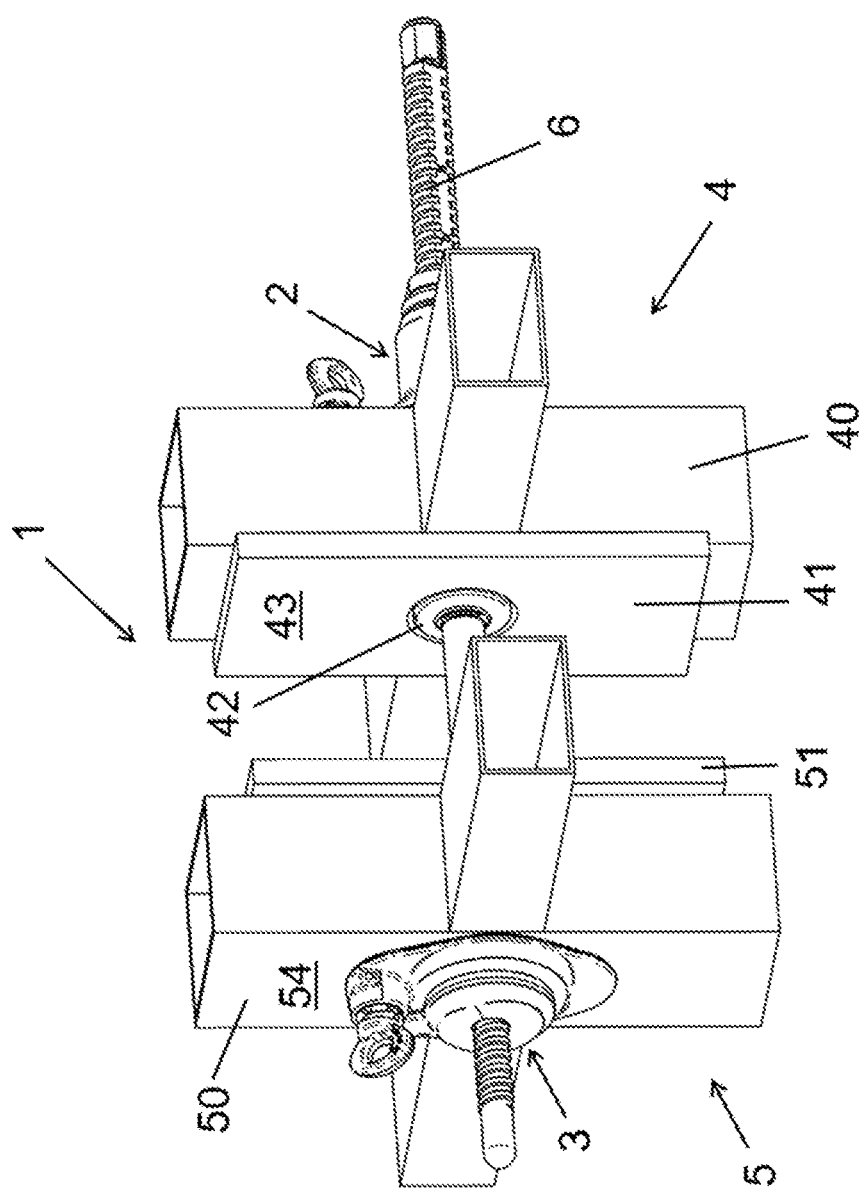
FIG. 2 shows a second perspective view of the vertical formwork of FIG. 1.
Figure 3:
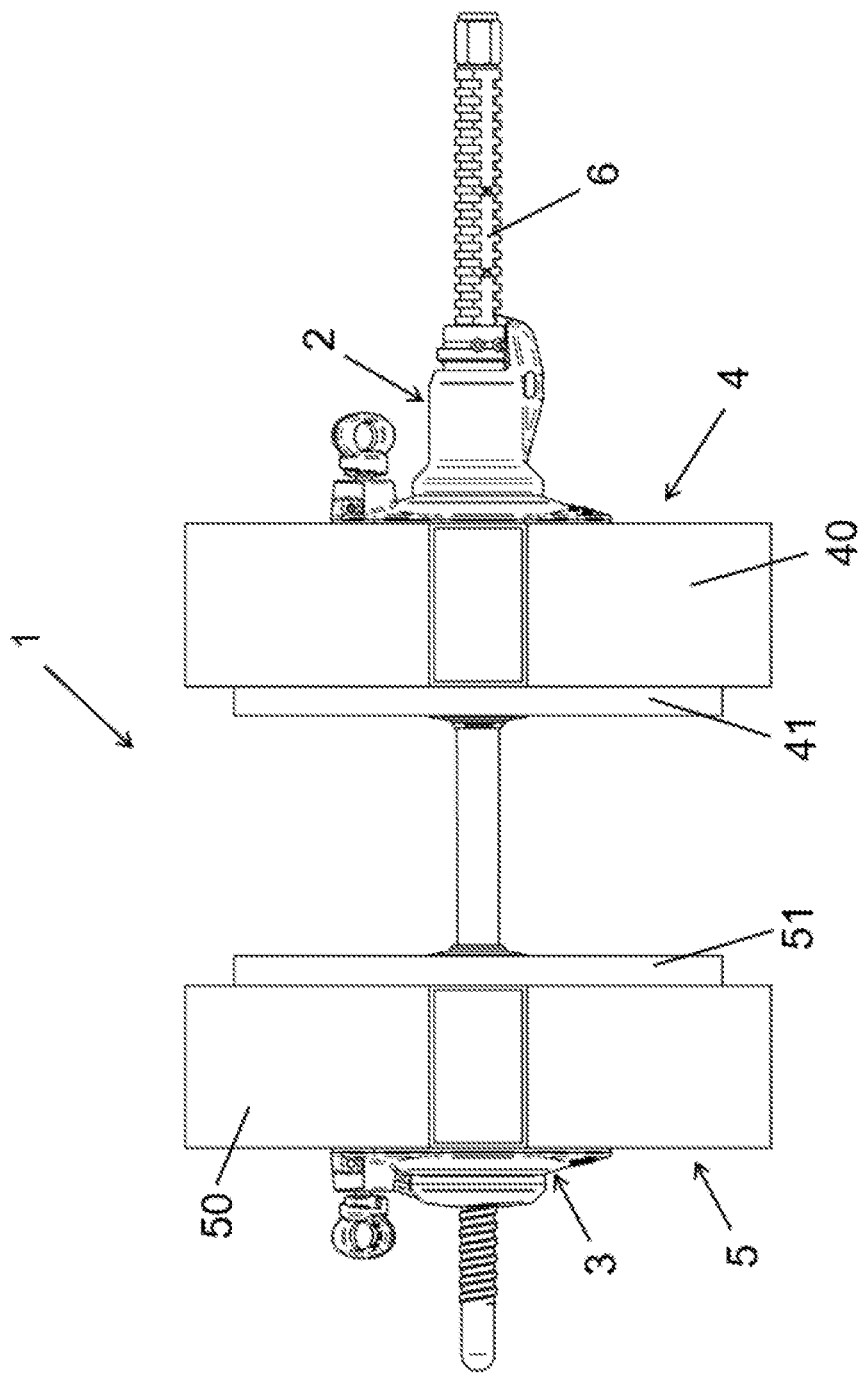
FIG. 3 shows a front view of the vertical formwork of FIG. 1.
Figure 4:
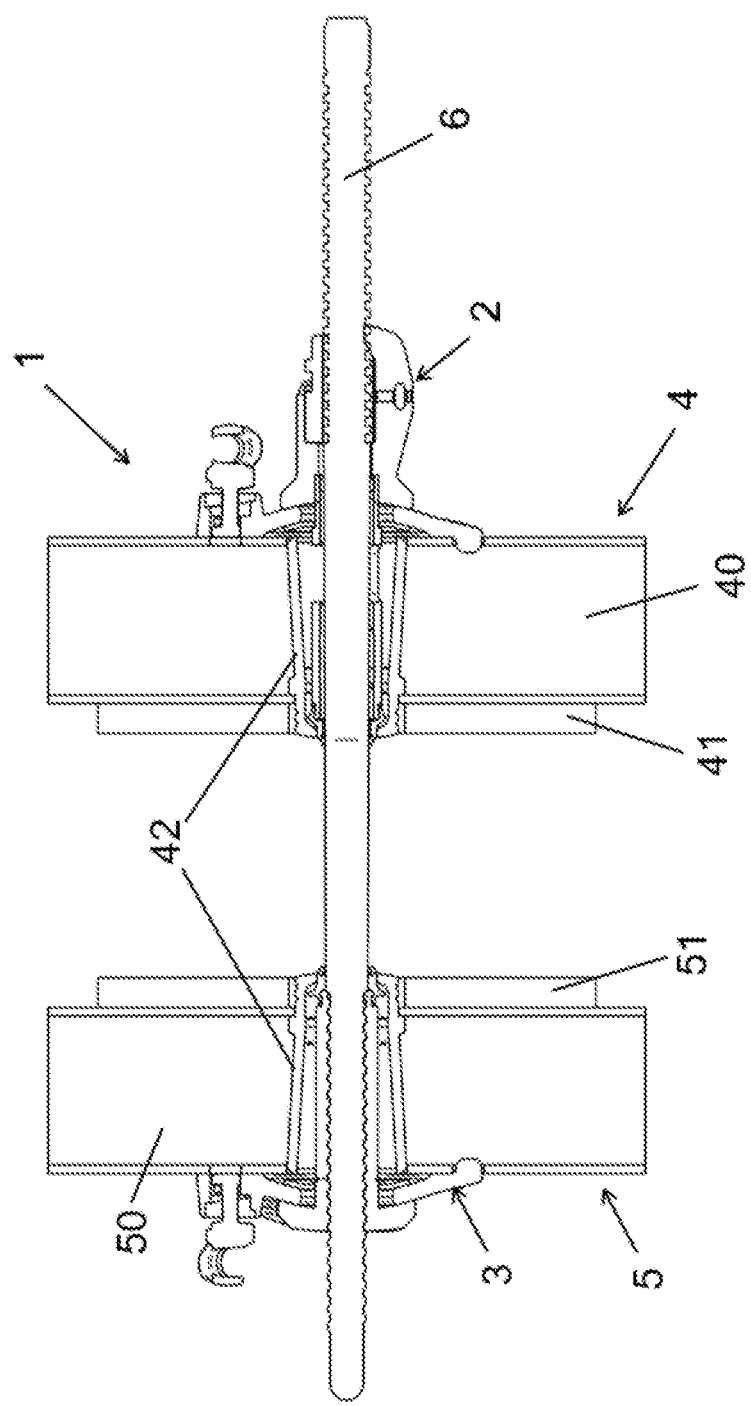
FIG. 4 shows a section view of the vertical formwork of FIG. 1.
Figure 5:
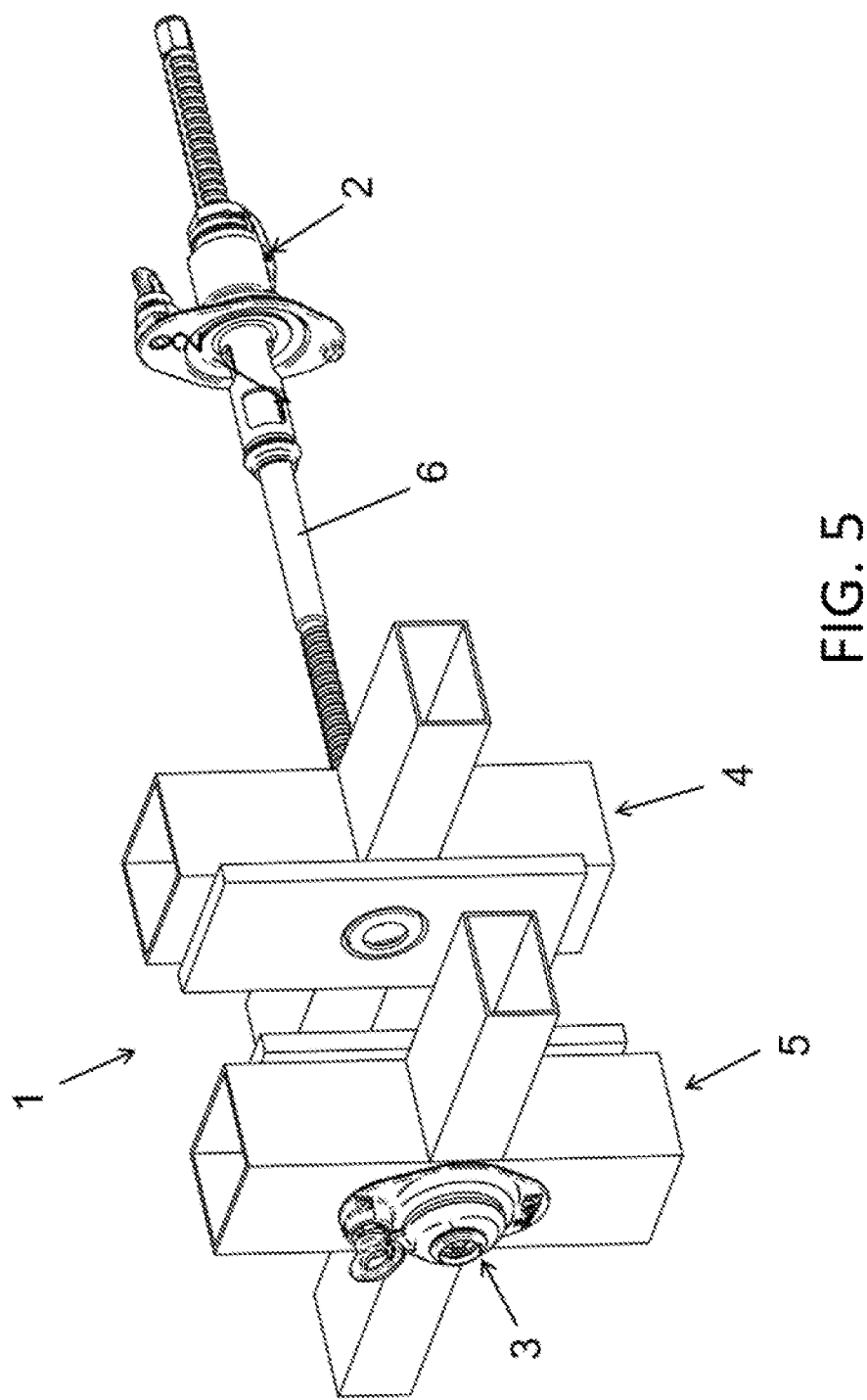
FIG. 5 shows an exploded view of the vertical formwork of FIG. 1.

FIGS. 1 to 5 show a vertical formwork 1 according to one embodiment.

The vertical formwork 1 comprises two formwork panels 4 and 5 arranged facing one another, an anchor 2 and 3 fixed to each of the formwork panels 4 and 5, and a tie rod 6 fixed to the anchors 2 and 3 fixed in each of the formwork panels 4 and 5.

In this embodiment, both formwork panels 4 and 5 are identical. Each of the formwork panels 4 and 5 respectively comprises a structure 40 and 50, a board 41 and 51 fixed to the structure 40 and 50, and a bushing 42 and 52 going through the structure 40 and 50 and the board 41 and 51. Preferably, the board 41 and 51 is made of wood and the structure 40 and 50 and the bushing 42 and 52 are made of metal. For the sake of clarity, the formwork panels 4 and 5 are only partially depicted in the drawings.

The vertical formwork 1 of this embodiment is a vertical formwork suitable for being adjusted from one face, i.e., the tie rod 6 can be fixed from one side of the formwork. In systems of this type one of the anchors, referred to as rear anchor 3, is fixed to one of the formwork panels, and referred to as rear formwork panel 5, before the formwork panels 4 and 5 are positioned. Once the formwork panels 4 and 5 are positioned, the operator is on the opposite side, fixing the other anchor 2, referred to as front anchor 2, and fixing the tie rod 6 to both anchors 2 and 3. To understand this document, the front part will be considered the part where the operator fixing the tie rod 6 is located. Therefore, the formwork panel arranged on the side of the operator will be referred to as the front formwork panel 4, and the formwork panel facing the front panel 4 will be referred to as the rear formwork panel 5. Likewise, the anchor fixed to the front formwork panel 4 will be referred to as front anchor 2, and the anchor fixed to the rear formwork panel 5 will be referred to as the rear anchor 3. Furthermore, the inner face 43 and 53 of the formwork panel 4 and 5 will be considered the face suitable for being arranged in contact with the concrete and the outer face 44 and 54 of the formwork panel 4 and 5 will be considered the face opposite the inner face 43 and 53.

Figure 18:
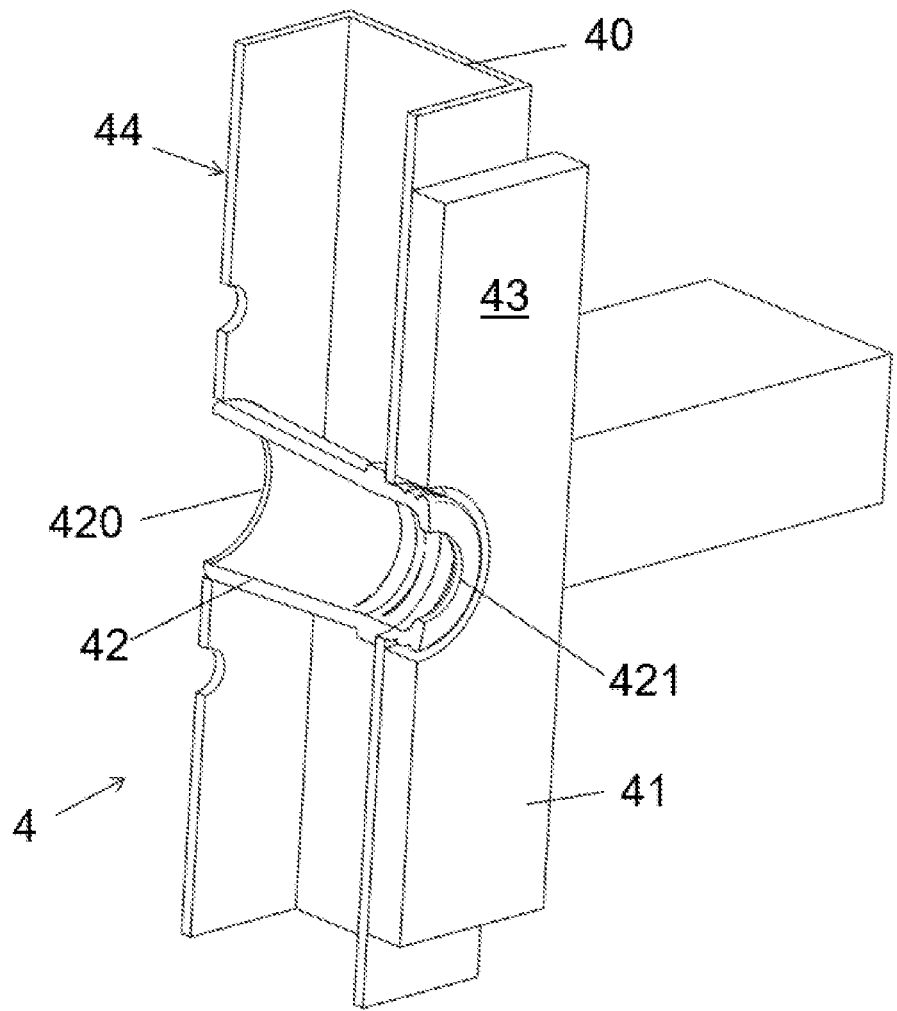
FIG. 18 shows a section view of a formwork panel of the vertical formwork of FIG. 1.

In this embodiment, the formwork panel 4, shown in detail in FIG. 18, comprises a housing extending from the outer face 44 to the inner face 43. The bushing 42 of the formwork panel 4 is arranged in the housing. The bushing 42 forms a housing in which part of the corresponding anchor 2 is housed. The bushing 42 has an inlet opening 420 which is arranged flush with the outer face 44 of the formwork panel 4, and an outlet opening 421 which is arranged flush with the inner face 43 of the formwork panel 4, the diameter of the outlet opening 421 being smaller than the diameter of the inlet opening 420. The configuration of the rear formwork panel 5 is the same as that of the front formwork panel 4.

In other embodiments, depending on the dimensions of the formwork panel, each formwork panel can comprise a plurality of housings, a bushing and a respective anchor being arranged in each of them, such that two facing formwork panels can be fixed to one another through a plurality of tie rods fixed to the anchors.

Figure 6:
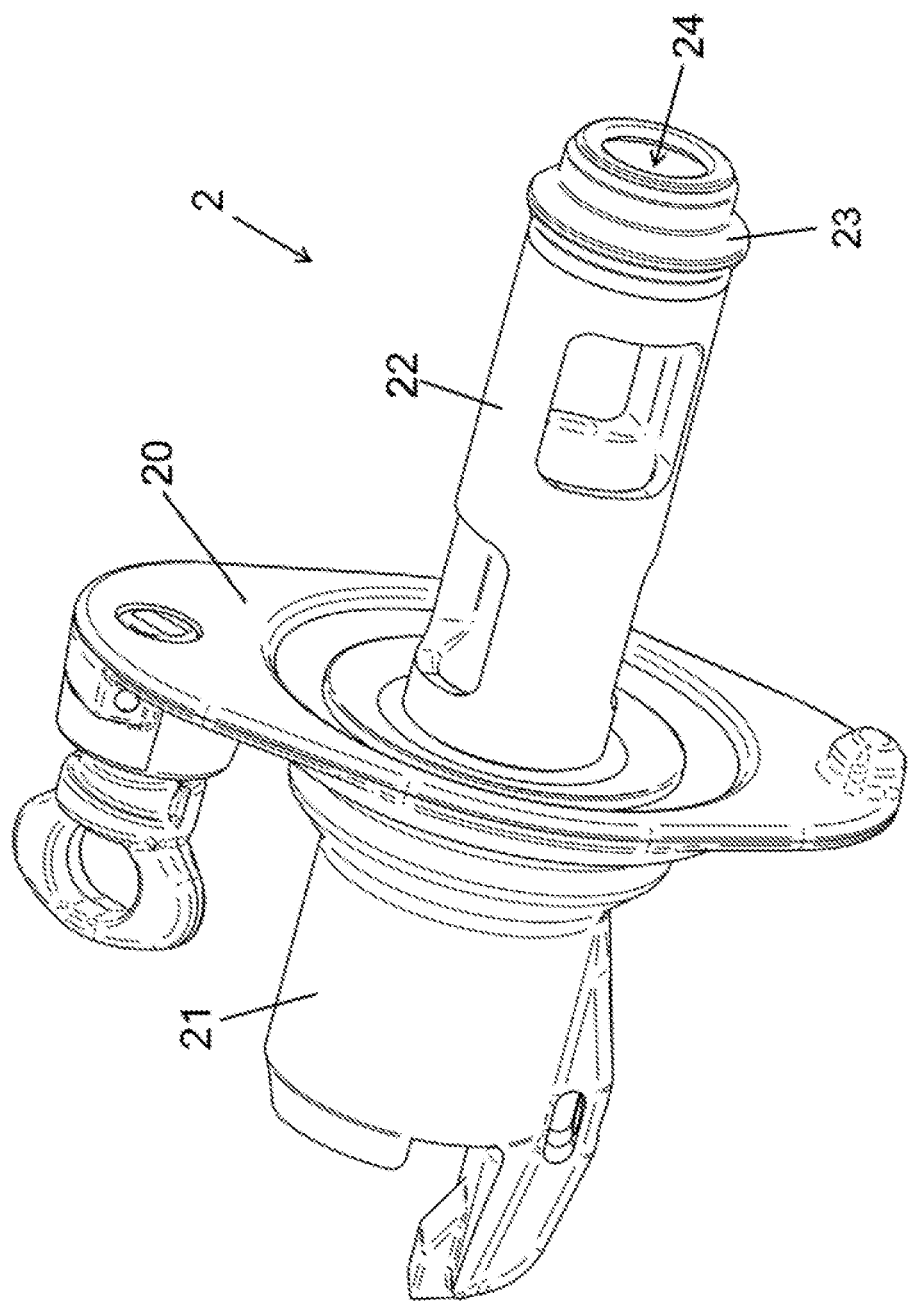
FIG. 6 shows a perspective view of the front anchor of the vertical formwork of FIG. 1.
Figure 7:
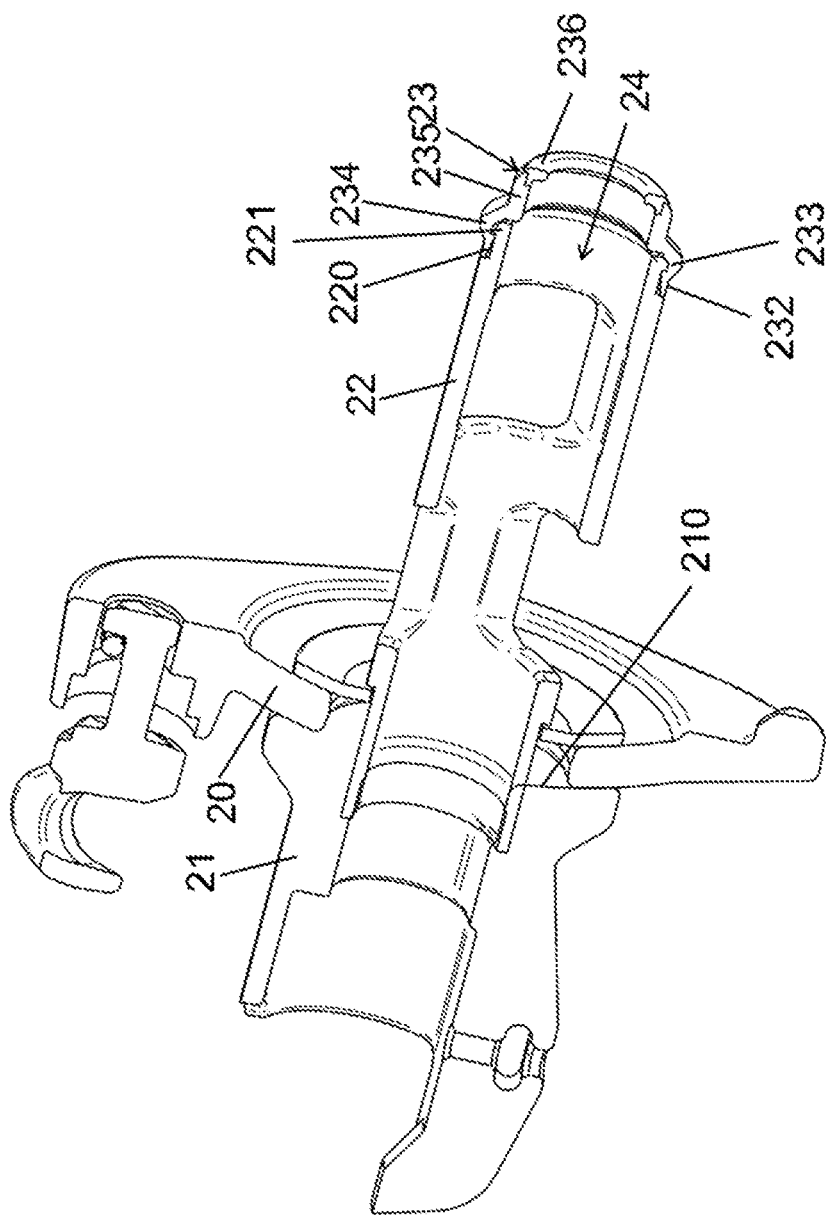
FIG. 7 shows a section view of the front anchor of FIG. 6.
Figure 12:
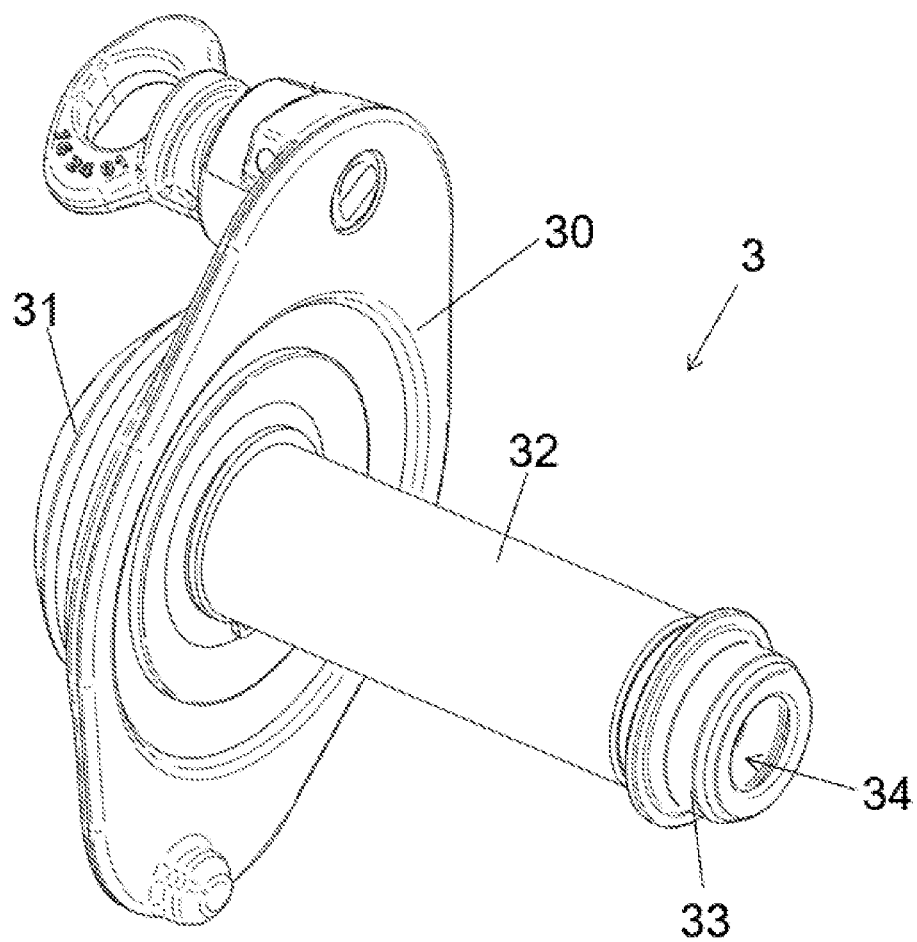
FIG. 12 shows a perspective view of the rear anchor of the vertical formwork of FIG. 1.
Figure 13:
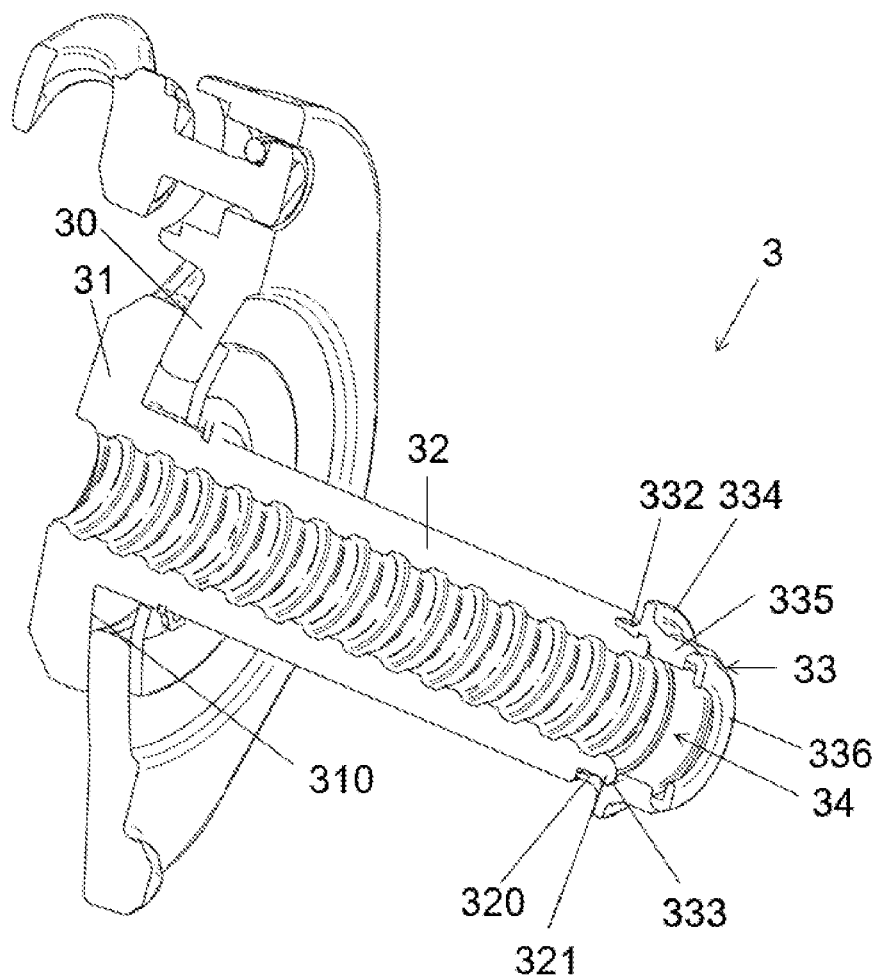
FIG. 13 shows a section view of the rear anchor of FIG. 12.

As discussed above, the vertical formwork 1 comprises an anchor 2 and 3 suitable for being fixed to each of the formwork panels 4 and 5. FIGS. 6 and 7 show the front anchor 2 in detail, whereas FIGS. 12 and 13 show the rear anchor 3 in detail. Each anchor 2 and 3 comprises a housing 24 and 34 suitable for receiving a part of the tie rod 6 fixing the formwork panels 4 and 5 facing one another.

Each anchor 2 and 3 also comprises sealing means configured for sealing the anchor 2 and 3 with respect to the formwork panel 4 and 5 in which it is fixed and the anchor 2 and 3 with respect to the part of the tie rod 6 housed in the housing 24 and 34 of the anchor 2 and 3. The sealing means comprise a sealing element 23 and 33 which is arranged at the end of the anchor 2 and 3 configured for being arranged in the proximity of the inner face 43 and 53 of the corresponding formwork panel 4 and 5, the sealing element 23 and 33 sealing both the anchor 2 and 3 with respect to the formwork panel 4 and 5 in which it is fixed, and the anchor 2 and 3 with respect to the part of the tie rod 6 housed in the housing 24 and 34 of the anchor 2 and 3.

The sealing means of vertical formworks are elements which tend to deteriorate with use, and for this reason it is customary to have to change them. The fact that the sealing element 23 and 33 is arranged in the anchor 2 and 3 and not in the formwork panel 4 and 5 makes it easier to replace it, since the anchors 2 and 3 are elements which are more manageable than the formwork panels 4 and 5 in regard to dimensions and weight. Furthermore, deterioration due to abrasion of the sealing elements 23 and 33 is prevented when cleaning the formwork panels 4 and 5 with wire brushes to remove cement residues that may remain after using the formwork panels 4 and 5. By arranging the sealing element 23 and 33 at the end of the anchor 2 and 3 instead of inside the anchor 2 and 3, the sealing element 23 and 33 is more accessible and can therefore be replaced more easily. Furthermore, the two required seals are established with a single sealing element 23 and 33 so that there is no cement leakage.

In this embodiment, each anchor 2 and 3 comprises a respective tubular extension 22 and 32, the respective sealing element 23 and 33 being arranged at one end of the tubular extension 22 and 32. The tubular extension 22 and 32 comprises an outer fixing groove 220 and 320 which is arranged in the proximity of a first end 222 and 322 of the tubular extension 22 and 32. The sealing element 23 and 33 comprises an inner fixing ring 232 and 332 at one of its ends, the inner fixing ring 232 and 332 of the sealing element 23 and 33 being housed in the outer fixing groove 220 and 320 of the tubular extension 22 and 32. This type of clamping for fixing the sealing element 23 and 33 to the tubular extension 22 and 32 allows assembling and disassembling the sealing element 23 and 33 without having to use special tools to that end.

Furthermore, in this embodiment to make it easier to assemble and disassemble the sealing element 23 and 33 with respect to the corresponding tubular extension 22 and 32, the inner fixing ring 232 and 332 is cone-shaped.

In this embodiment, the tubular extension 22 and 32 comprises an abutment ring 221 and 321 after the outer fixing groove 220 and 320. The sealing element 23 and 33 comprises an inner housing 233 and 333 after the inner fixing ring 232 and 332 in which the abutment ring 221 and 321 of the corresponding tubular extension 22 and 32 is housed.

Figure 8:
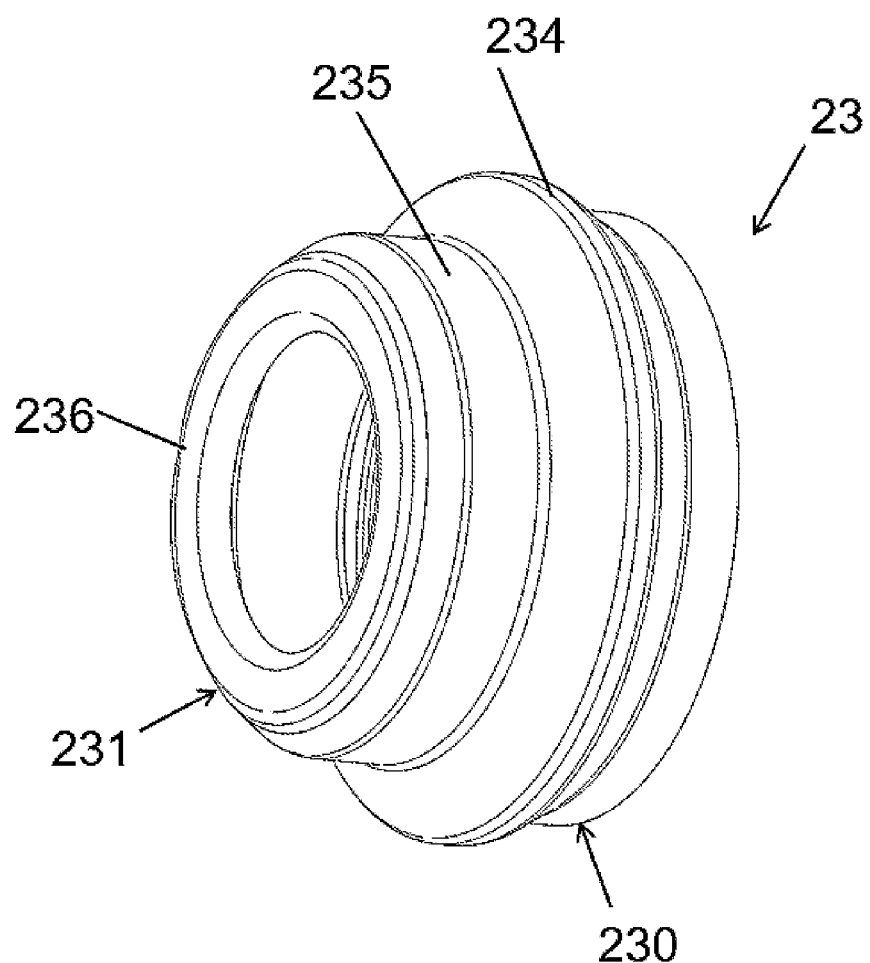
FIG. 8 shows a perspective view of the sealing element of the front anchor of FIG. 6.
Figure 9:
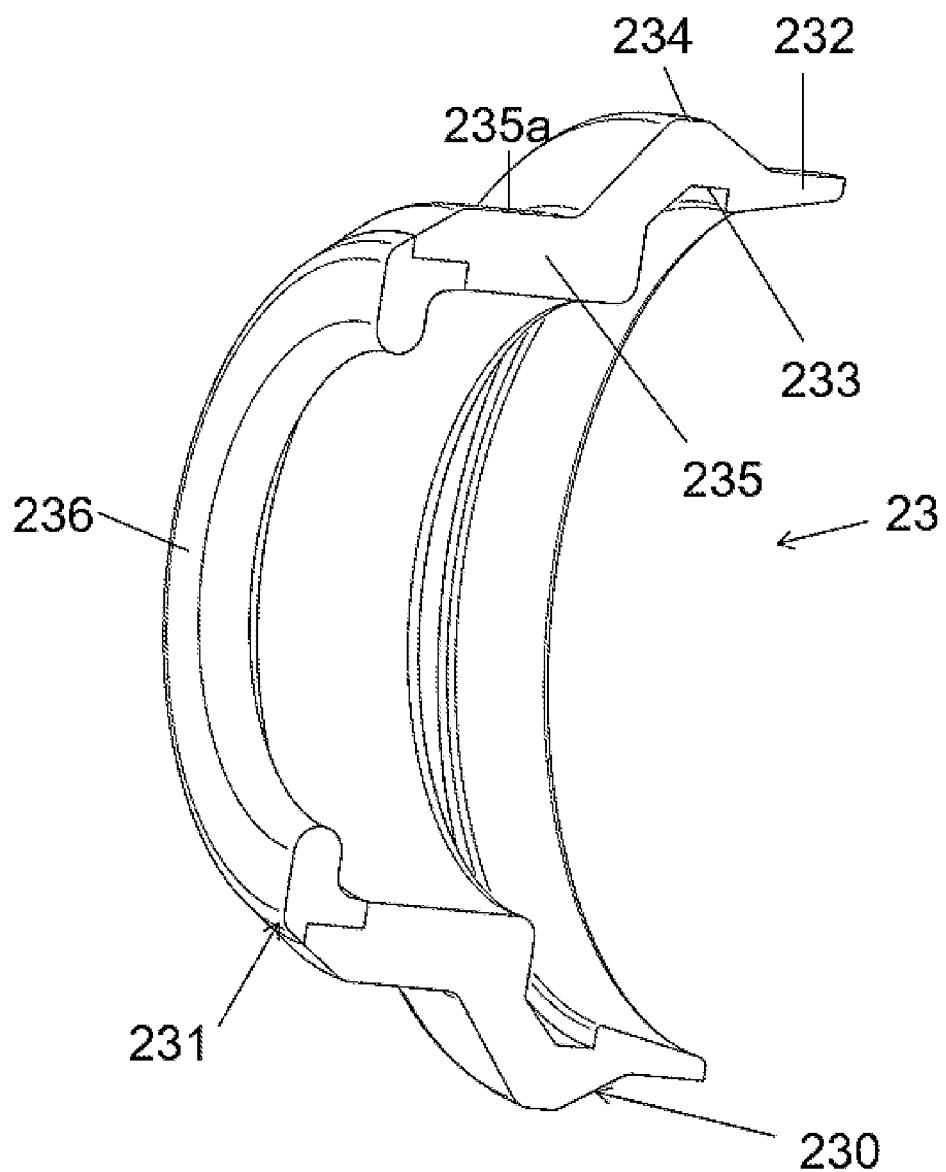
FIG. 9 shows a section view of the sealing element of the anchor of FIG. 6.
Figure 10:
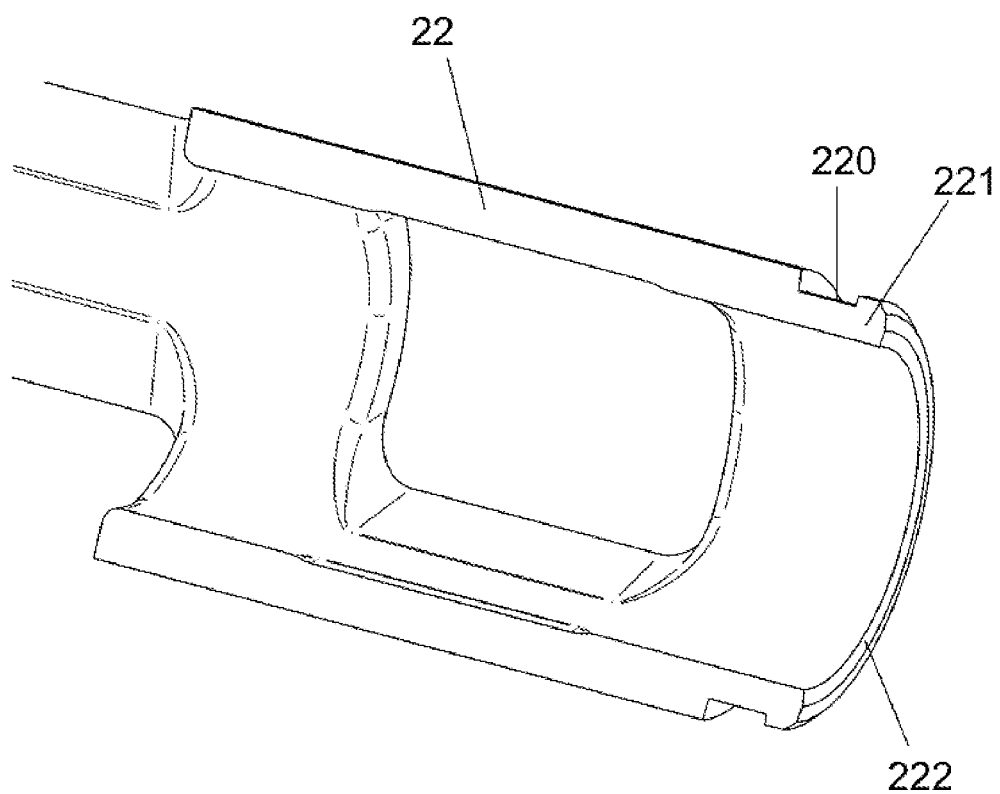
FIG. 10 shows a section view of the tubular extension of the front anchor of FIG. 6.
Figure 14:
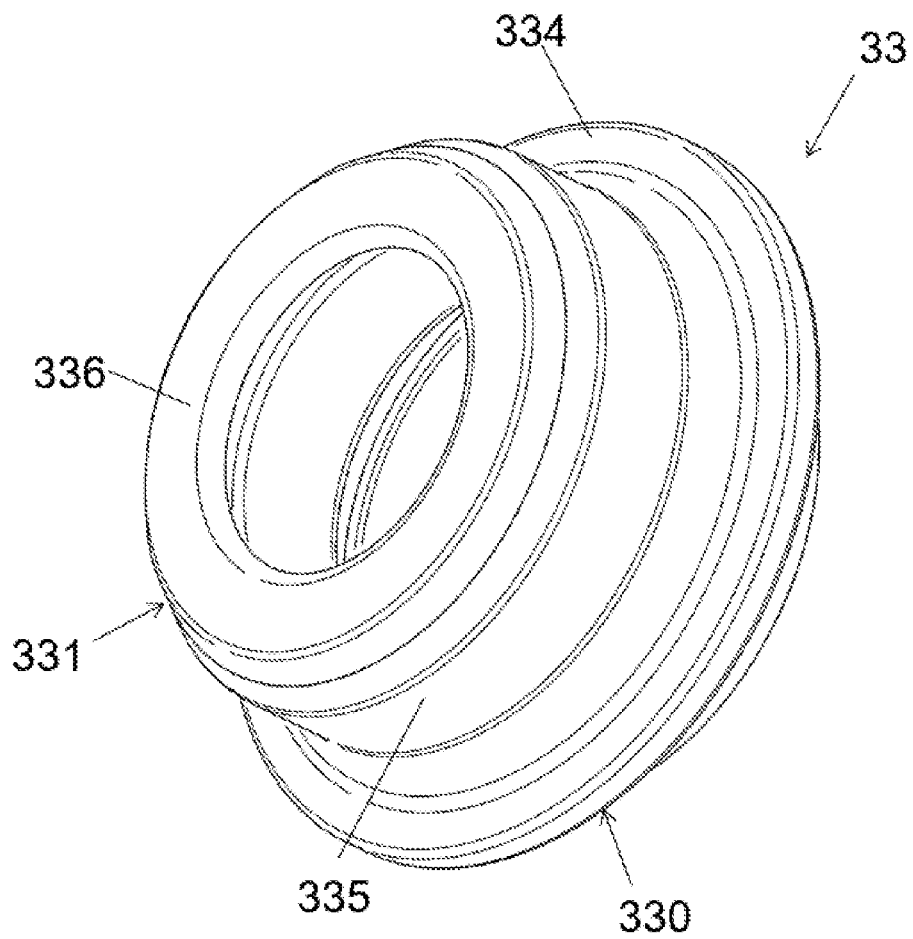
FIG. 14 shows a perspective view of the sealing element of the rear anchor of FIG. 12.
Figure 15:
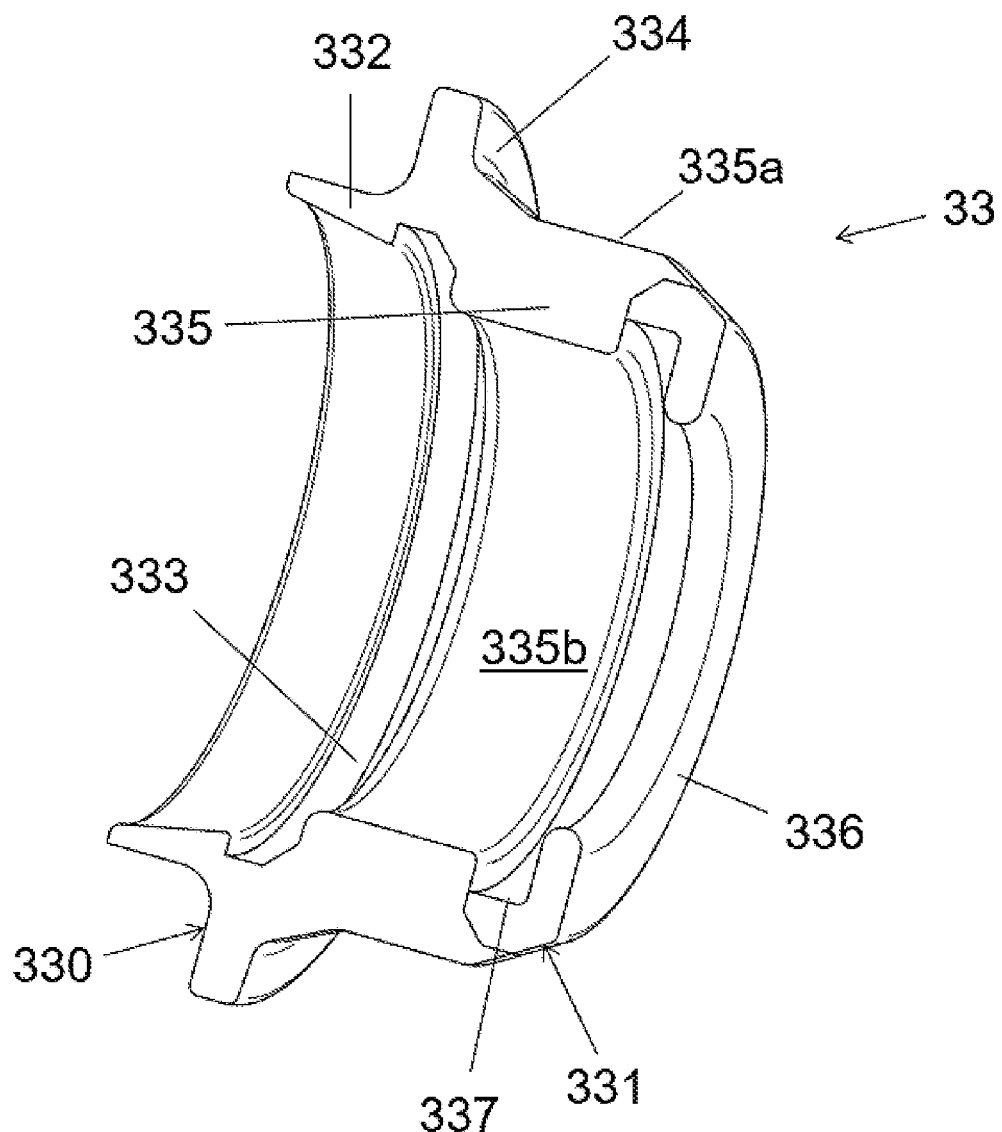
FIG. 15 shows a section view of the sealing element of the rear anchor of FIG. 12.
Figure 16:
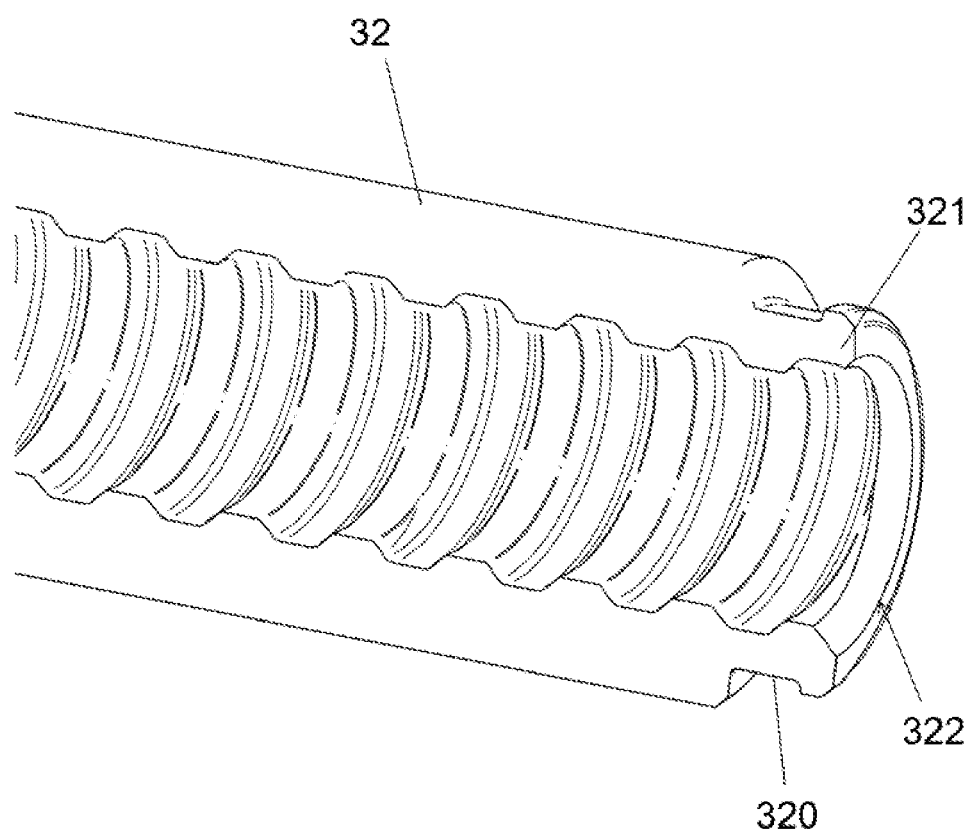
FIG. 16 shows a section view of the tubular extension of the rear anchor of FIG. 12.

FIGS. 8 and 9 show the sealing element 23 of the front anchor 2 in detail, whereas FIGS. 14 and 15 show the sealing element 33 of the rear anchor 3 in detail. Arranging the sealing element 23 and 33 in the anchor 2 and 3 instead of in the formwork panel 4 and 5 allows optimizing the design of the sealing elements 23 and 33 according to the function of each sealing element 23 and 33. In the case of arranging the sealing elements in the formwork panels, this differentiation is hindered since it is common for both the front and rear formwork panels to be identical.

In this embodiment, both sealing elements 23 and 33 comprise an outer guiding ring 234 and 334 diametrically projecting with respect to the rest of the sealing element 23 and 33 and configured for guiding the end of the anchor 2 and 3 to the outlet opening 421 and 521 of the bushing 42 and 52 of the formwork panel 4 and 5 in which it is fixed. The outer guiding ring 234 and 334 cooperates with the inner wall of the bushing 42 and 52 such that the end of the anchor 2 and 3 is guided to the outlet opening 421 and 521 of the bushing 42 and 52. The outer guiding ring 234 and 334 thereby makes it easier for the sealing element 23 and 33 to come out of the outlet opening 421 and 521 when the anchor 2 and 3 is inserted in the bushing 42 and 52.

In this embodiment, both sealing elements 23 and 33 also comprise a sealing ring 235 and 335. The outer wall 235a and 335a of the sealing ring 235 and 335 is supported against the formwork panel 2 and 3 in which it is fixed. Specifically, in this embodiment the outer wall 235a and 335a of the sealing ring 235 and 335 is supported against the outlet opening 421 and 521 of the respective bushing 42 and 52. The anchor 2 and 3 is thereby sealed with respect to the bushing 42 and 52, i.e., the anchor 2 and 3 is thereby sealed with respect to the formwork panel 4 and 5.

Figure 11:
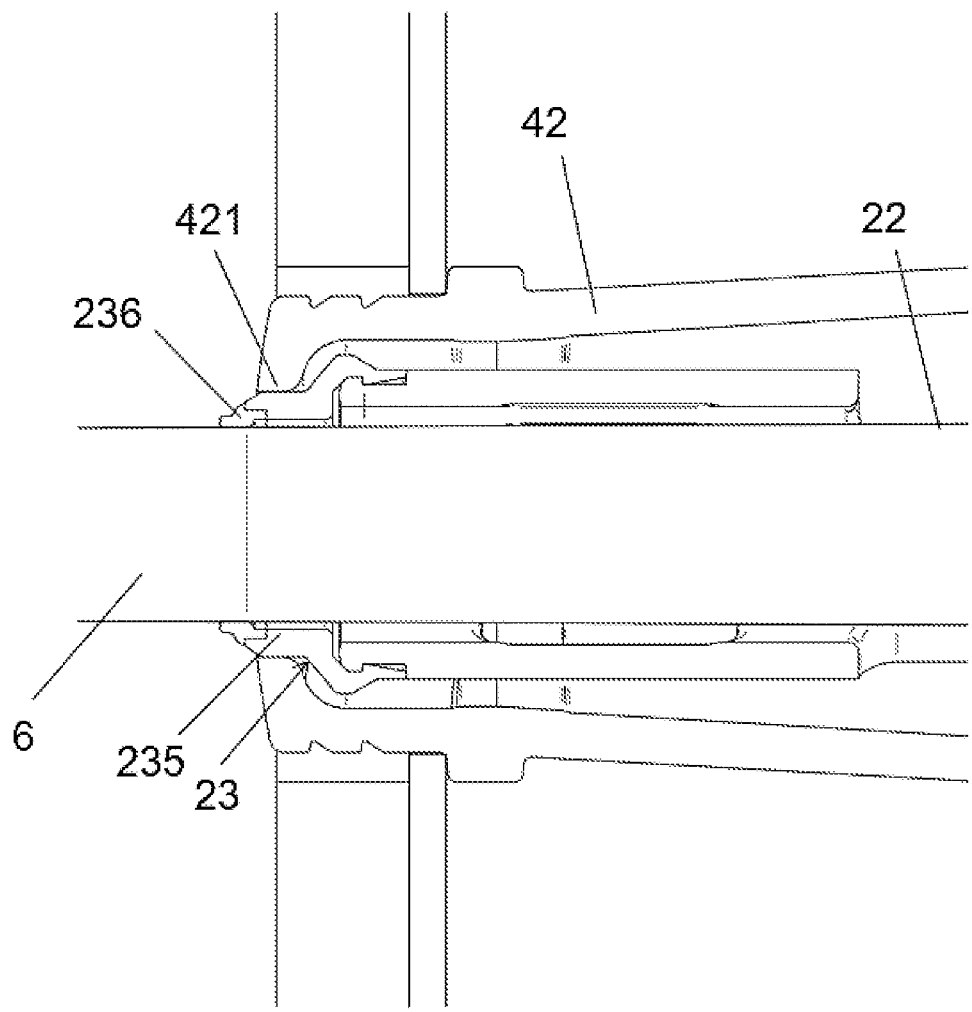
FIG. 11 shows a detailed section view of the front anchor of FIG. 6 when it is fixed to the front formwork panel.
Figure 17:
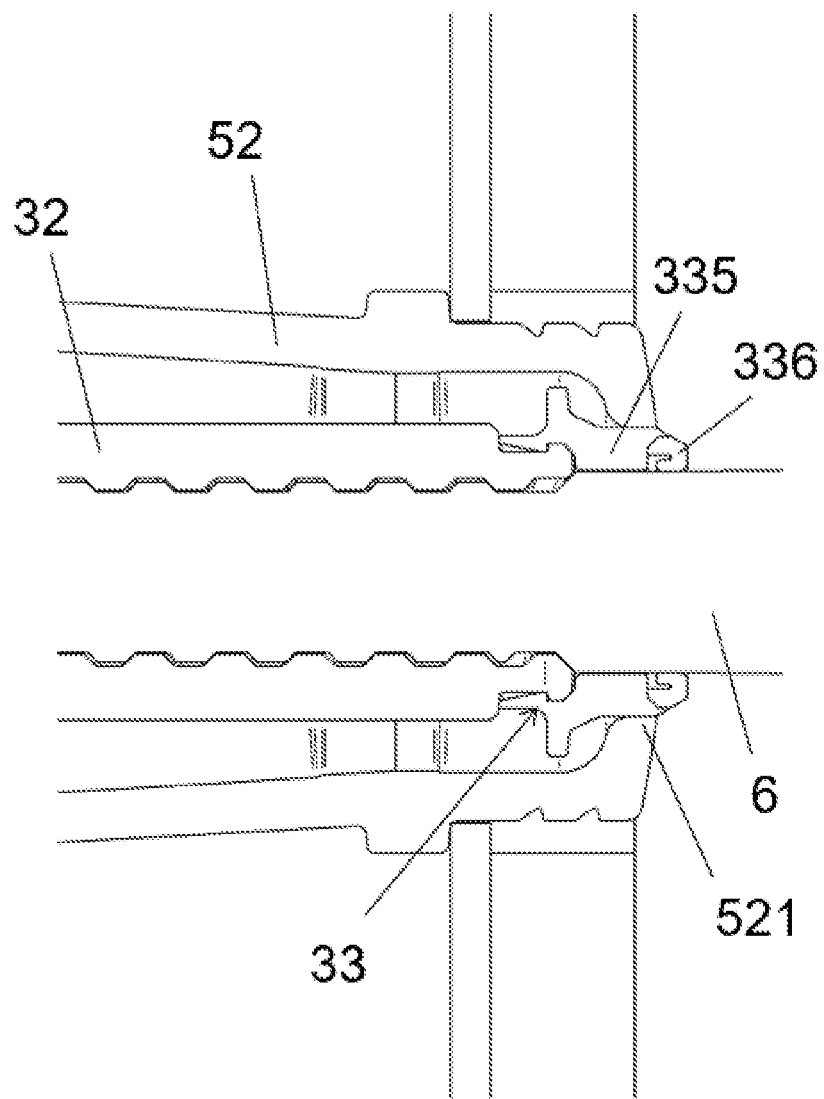
FIG. 17 shows a detailed section view of the rear anchor of FIG. 12 when it is fixed to the rear formwork panel.

As it can be seen in FIGS. 11 and 17, the diameter of the outer wall 235a and 335a of the sealing ring 235 and 335 is substantially equal to or larger than the diameter of the outlet opening 421 and 521 of the formwork panel 4 and 5 in which the anchor is configured to be fixed such that the outer wall 235a and 335a of the sealing ring 235 and 335 is supported against the outlet opening 421 and 521 of the respective bushing 42 and 52. This way is avoided that concrete can enter to the bushing 42 and 52 thought the outlet opening 421 and 521.

In this embodiment, both sealing elements 23 and 33 also comprise an end ring 236 and 336 suitable for being supported against the tie rod 6 housed in the respective anchor 2 and 3, such that the anchor 2 and 3 is sealed with respect to the tie rod 6. The diameter of the end ring 236 and 336 is substantially equal to or smaller than the diameter of the section of the tie rod 6 where the end ring 236, 336 is supported when the end ring 236, 33 is supported against the tie rod 6. This way it is avoided that concrete can enter to the anchor 2 and 3 thought its housing 24 and 34 where part of the tie rod 6 is housed.

In the case of the front anchor 2, the diameter of the tie rod 6 in contact with the end ring 236 of the sealing element 23 slightly varies depending on the width of the wall to be built, i.e., the distance left between the inner faces 43 and 53 of the formwork panels 4 and 5, since the part of the tie rod 6 in contact with the end ring 236 is cone-shaped. Therefore, the end ring 236 adapts to the variation in diameter of the tie rod 6 by sealing the front anchor 2 with respect to the tie rod 6.

Furthermore, in this embodiment when the tie rod 6 is housed in the housing 34 of the rear anchor 3, the end ring 336, due to the dimensions of the tie rod 6, tends to bend into the sealing element 33. The sealing element 33 comprises an inner gap 337 between the end ring 336 and the sealing ring 335 such that when the tie rod 6 is housed in the anchor 3, the part of the end ring 336 bent inwardly can be housed in the inner gap 337.

Preferably the sealing ring 235 and 335 is harder than the end ring 236 and 336, such that the end ring 236 and 336 is more flexible so it can be adapted better to the variation in diameter of the tie rod 6 in contact with the end ring 236 and 336.

In this embodiment, the inner wall 335b of the sealing ring 335 of the sealing element 3 of the rear anchor 3 is also supported against the tie rod 6, because the diameter of the inner wall 335b of the sealing ring 335 is substantially equal to or smaller than the diameter of the section of the tie rod 6 in contact with the inner wall 335b thereby achieving a double seal of the tie rod 6 with respect to the rear anchor 3.

In this embodiment, when the anchor 2 and 3 is fixed to the corresponding formwork panel 4 and 5, the end ring 236 and 336 projects from the bushing 42 and 52 of the formwork panel 4 and 5. Preferably, part of the sealing ring 235 and 335 also projects from the bushing 42 and 52.

In this embodiment, both sealing elements 23 and 33 comprise a first part 230 and 330 comprising the inner fixing ring 232 and 332, the outer guiding ring 234 and 334 and the sealing ring 235 and 335, and a second part 231 and 331 after the first part 230 and 330 comprising the end ring 236 and 336.

The first part 230 and 330 of both sealing elements 23 and 33 is preferably made with a material harder than the second part 231 and 331 of the sealing element 23 and 33, because since part of the first part of the sealing element 23 and 33 is supported against the bushing 42 and 52 it deteriorates more.

The sealing element 23, 33 is preferably a rubber gasket which is made in this embodiment by injecting two materials having a different hardness. The material used for making the sealing elements 23 and 33 is preferably an elastomer.

In this embodiment, both the front anchor 2 and the rear anchor 3 comprise a dome plate 20 and 30 comprising a spherical part with an opening 200 and 300, and a body 21 and 31 which is arranged in the opening 200 and 300. The body 21 and 31 comprises a first part 210 and 310 having a support wall with a spherical shape coupled like a ball and socket joint to the spherical part of the dome plate 20 and 30, and the tubular extension 22 and 32 after the first part 210 and 310.

In this embodiment, the body 21 and 31 of the anchor comprises the housing 24 and 34 of the anchor 2 and 3. The housing 34 of the rear anchor 3 is a threaded housing and is suitable for receiving a threaded end of the tie rod 6. Therefore, the tubular extension 32 of the rear anchor 3 has a dual function, i.e., on one hand it helps fix the threaded end of the tie rod 6 to the anchor 3, and on the other it allows arranging the sealing element 33 in the proximity of the inner face 53 of the formwork panel 5. The housing 24 of the front anchor 2 is a non-threaded housing. The tubular extension 22 of the front anchor 2 has the function of arranging the sealing element 23 in the proximity of the inner face 43 of the formwork panel 4.

As discussed above, the first part 210 and 310 of the body 21 and 31 has certain play like a ball and socket joint with the spherical part of the dome plate 20 and 30 in which the body 21 and 31 is arranged. This assures that when the outlet openings 421 and 521 of the bushings 42 and 52 of the formwork panels 4 and 5 are not completely aligned, and therefore the tie rod 6 is arranged in a slanted manner, the support wall of the body 21 and 31 is supported in its entirety on the dome plate 20 and 30. Since the sealing element 23 and 33 is arranged at one end of the tubular extension 22 and 32, the other end of which is in turn fixed to the first part 210 and 310 of the body 21 and 31, it is assured that the sealing element 23 and 33 is always aligned with the tie rod 6 such that it deteriorates less than when the sealing element is arranged in the formwork panel, since in this situation if the tie rod is arranged in a slanted manner with respect to the axis of the sealing element, the sealing element deteriorates more.

In this embodiment, the dome plate 20 and 30 of each anchor 2 and 3 is fixed to the outer face 44 and 54 of the corresponding formwork panel 4 and 5. To that end, the dome plate 20 and 30 comprises a screw and a pin, whereas the structure 40 and 50 of the formwork panel 4 and 5 comprises two non-threaded holes in which the screw and the pin are housed such that the anchor 2 and 3 is fixed to the corresponding formwork panel 4 and 5.

The following clauses disclose in an unlimited way additional implementations with each clause representing one or more implementations.

Clause 1: An anchor for a vertical formwork, the vertical formwork comprising two formwork panels (4, 5) facing one another and the anchor (2, 3) being suitable for being fixed to one of the formwork panels (4, 5), the anchor (2, 3) comprising
  a housing (24, 34) for receiving a part of a tie rod (6) fixing the two formwork panels (4, 5), and
  sealing means configured for sealing the anchor (2, 3) with respect to the formwork panel (4, 5) in which it is fixed and with respect to the tie rod (6) housed in the housing (24, 34) of the anchor (2, 3),
  the sealing means comprises a sealing element (23, 33) which is arranged at one end of the anchor (2, 3) and which is configured for sealing, when the anchor (2, 3) is fixed to the respective formwork panel (4, 5), both the anchor (2, 3) with respect to the formwork panel (4, 5) in which it is fixed and the anchor (2, 3) with respect to the tie rod (6) housed in the housing (24, 34) of the anchor (2, 3),
  wherein the sealing element (23, 33) comprises a sealing ring (235, 335), the sealing ring (235, 335) comprising an outer wall (235a, 335a) configured to be supported against the formwork panel (4, 5), and
  wherein the sealing element (23, 33) comprises an end ring (236, 336) configured to be supported against the tie rod (6) housed in the anchor (2, 3), such that the anchor (2, 3) is sealed with respect to the tie rod (6).

Clause 2: An anchor according to clause 1, wherein the diameter of the outer wall (235a, 335a) of the sealing ring (235, 335) is substantially equal to or larger than the diameter of an outlet opening (421, 521) of the formwork panel (4, 5) in which the anchor (2, 3) is configured to be fixed.

Clause 3: An anchor according to clause 1 or 2, wherein the diameter of the end ring (236, 336) is substantially equal to or smaller than the diameter of the section of the tie rod (6) where the end ring (236, 336) is supported when the end ring (236, 33) is supported against the tie rod (6).

Clause 4: An anchor according to any of the preceding clauses, wherein the sealing ring (235, 335) is harder than the end ring (236, 336).

Clause 5: An anchor according to any of the preceding clauses, comprising a tubular extension (22, 32), the sealing element (23, 33) being arranged at one end (222, 322) of the tubular extension (22, 32).

Clause 6: An anchor according to clause 5, wherein the tubular extension (22, 32) comprises an outer fixing groove (220, 320) which is arranged in the proximity of the end (222, 322) of the tubular extension (22, 32), and the sealing element (23, 33) comprises an inner fixing ring (232, 332) at one of its ends, the inner fixing ring (232, 332) of the sealing element (23, 33) being housed in the outer fixing groove (220, 320) of the tubular extension (22, 32).

Clause 7: An anchor according to any of the preceding clauses, wherein the sealing element (23, 33) comprises an outer guiding ring (234, 334) diametrically projecting with respect to the rest of the sealing element (23, 33) and configured for guiding the anchor (2, 3) to the outlet opening (421) of the formwork panel (4, 5) in which it is configured to be fixed.

Clause 8: An anchor according to any of the preceding clauses, wherein when the anchor (2, 3) is fixed to the respective formwork panel (4, 5), an inner wall of the sealing ring (335) is configured to be supported against the tie rod (6).

Clause 9: An anchor according to any of the preceding clauses, wherein the sealing element (23, 33) is a rubber gasket.

Clause 10: An anchor according to clause 5, wherein the sealing element (23, 33) comprises
  a first part (230, 330) comprising
    an inner fixing ring (232, 332) suitable for being housed in an outer fixing groove (220, 320) of the tubular extension (22, 32),
    an outer guiding ring (234, 334) diametrically projecting with respect to the rest of the sealing element (23, 33) and configured for guiding the anchor (2, 3) to the outlet opening (421) of the formwork panel (4, 5) in which it is fixed, and
    the sealing ring (235, 335), and
  a second part (231, 331) after the first part (230, 330) comprising
    the end ring (236, 336),
  the first part (230, 330) of the sealing element (23, 33) being harder than the second part (231, 331) of the sealing element (23, 33).

Clause 11: An anchor according to clause 10, wherein the sealing element (23, 33) is a rubber gasket made by injecting two materials having a different hardness.

Clause 12: An anchor according to any of the preceding clauses, comprising a dome plate (20, 30) comprising a spherical part with an opening (200, 300), and a body (21, 31) which is configured to be arranged in the opening (200, 300), the body (21, 31) comprising a first part (210, 310) coupled to the dome plate (200, 300) like a ball and socket joint, and the end at which the sealing element (23, 33) is arranged after the first part (210, 310).

Clause 13: An anchor according to any of the preceding clauses, wherein part of the sealing element (23, 33) projects from the respective formwork panel (4, 5) when the anchor (2, 3) is fixed to the respective formwork panel (4, 5).

Clause 14: A vertical formwork comprising at least
  two formwork panels (4, 5) arranged facing one another,
  an anchor (2, 3) according to any of the preceding clauses fixed to each of the formwork panels (4, 5), and
  a tie rod (6) fixed to the anchor (2, 3) of each of the formwork panels (4, 5).

What is claimed is:
1. A vertical formwork comprising:
  a first formwork panel having a first side, a second side opposite the first side and a first through opening extending between the first and second sides and being defined by an inner wall of the first formwork panel;

a second formwork panel having a first side, a second side opposite the first side and a second through opening extending between the first and second sides and being defined by an inner wall of the second formwork panel, the second side of the second formwork panel facing the second side of the first formwork panel;

a tie rod extending respectively through the first and second through openings of the first and second formwork panels;

a first anchor residing inside the first through opening of the first formwork panel, the first anchor including a housing in which a first portion of the tie rod passes, the first anchor including a first sealing element arranged at an end of the first anchor and configured to provide a first seal between the first anchor and the first formwork panel and to provide a second seal between the first anchor and the tie rod when the first anchor resides inside the first through opening of the first formwork panel, the first sealing element including a first sealing ring having an outer wall configured to be supported against the inner wall of the first through opening of the first formwork panel to provide the first seal, the first sealing element including a second sealing ring that is configured to be supported against the tie rod to provide the second seal; and a second anchor residing inside the second through opening of the second formwork panel, the second anchor including a housing in which a second portion of the tie rod passes, the second anchor including a second sealing element arranged at an end of the second anchor and configured to provide a first seal between the second anchor and the second formwork panel and to provide a second seal between the second anchor and the tie rod when the second anchor resides inside the second through opening of the second formwork panel, the second sealing element including a first sealing ring having an outer wall configured to be supported against the inner wall of the second through opening of the second formwork panel to provide the first seal, the second sealing element including a second sealing ring that is configured to be supported against the tie rod to provide the second seal;

the first and second anchors respectively including a first and second tubular extension having an end, the first sealing element being arranged on the end of the first tubular extension, the second sealing element being arranged on the end of the second tubular extension;

the first tubular extension including an outer fixing groove that is arranged in an end section of the first tubular extension, the first sealing element including an inner fixing ring housed in the outer fixing groove of the first tubular extension to hold the first sealing element on the end section of the first tubular extension, and the second tubular extension including an outer fixing groove that is arranged in an end section of the second tubular extension, the second sealing element including an inner fixing ring housed in the outer fixing groove of the second tubular extension to hold the second sealing element on the end section of the second tubular extension.

2. The vertical formwork according to claim 1, wherein the first sealing ring of each of the first and second sealing elements is respectively harder than the second sealing ring of the first and second sealing elements.

3. The vertical formwork according to claim 1, wherein each of the first and second sealing elements includes an outer guiding ring diametrically projecting with respect to the remainder of the respective first and second sealing elements and configured for respectively guiding the first and second anchors inside the first and second through openings of the first and second formwork panels.

4. An anchor configured to reside inside a through opening of a formwork panel of a vertical formwork through which a tie rod extends, the through opening being defined by an inner wall and extending between a first side and a second side of the formwork panel, the anchor comprising:

a housing for receiving a part of the tie rod;

a sealing element arranged at an end of the anchor and configured to provide a first seal between the anchor and the formwork panel and to provide a second seal between the anchor and the tie rod when the anchor resides inside the through opening of the formwork panel, the sealing element including a first sealing ring having an outer wall configured to be supported against the inner wall of the formwork panel to provide the first seal, the sealing element including a second sealing ring that is configured to be supported against the tie rod to provide the second seal; and the anchor further comprising a dome plate comprising a spherical part with an opening, and a body which is configured to be arranged in the opening, the body including a first part coupled to the dome plate with a ball and socket joint, the first part configured to reside on a first side of the formwork panel and the sealing element being configured to reside inside the through opening or to at least partially project from a second side of the formwork panel opposite the first side.

5. The anchor according to claim 4, wherein the second sealing ring is disposed at an end of the anchor.

6. The anchor according to claim 4, wherein the first sealing ring is harder than the second sealing ring.

7. The anchor according to claim 4, wherein the anchor includes a tubular extension having an end, the sealing element being arranged on the end of the tubular extension.

8. The anchor according to claim 4, wherein the outer wall of the first sealing ring has a diameter that is equal to or larger than a diameter of a section of the through opening of the formwork panel in which the second sealing ring is configured to reside.

9. The anchor according to claim 4, wherein the second sealing ring has a diameter that is equal to or smaller than a diameter of a section of the tie rod on which the second sealing ring is configured to be supported.

10. The anchor according to claim 8, wherein the second sealing ring has a diameter that is equal to or smaller than a diameter of a section of the tie rod on which the second sealing ring is configured to be supported.

11. The anchor according to claim 7, wherein the tubular extension includes an outer fixing groove that is arranged in an end section of the tubular extension, and the sealing element includes an inner fixing ring housed in the outer fixing groove of the tubular extension to hold the sealing element on the end section of the tubular extension.

12. The anchor according to claim 4, wherein the sealing element includes an outer guiding ring diametrically projecting with respect to the remainder of the sealing element and configured for guiding the anchor inside the through opening of the first formwork panel.

13. The anchor according to claim 11, wherein the sealing element includes an outer guiding ring diametrically projecting with respect to the remainder of the sealing element and configured for guiding the anchor inside the through opening of the first formwork panel.

14. The anchor according to claim 4, wherein when the first sealing ring has an inner wall that is configured to be supported against the tie rod.

15. The anchor according to claim 4, wherein the sealing element is made of rubber.

16. The anchor according to claim 13, wherein the inner fixing ring, outer guiding ring and the first sealing ring comprise a first part of the sealing element, and the second sealing ring comprises a second part of the sealing element, the first part of the sealing element being harder than the second part of the sealing element.

17. The anchor according to claim 16, wherein the sealing element is made of rubber.

\* \* \* \* \*